United States Patent [19]

Karpik

[11] Patent Number: 5,370,198

[45] Date of Patent: Dec. 6, 1994

[54] LONG TRAVEL SUSPENSION FOR TRACKED VEHICLE

[76] Inventor: Gerard J. Karpik, 1647 Long Lake Rd., Eveleth, Minn. 55734

[21] Appl. No.: 110,879

[22] Filed: Aug. 24, 1993

Related U.S. Application Data

[63] Continuation-in-part of Ser. No. 951,152, Sep. 25, 1992, abandoned.

[51] Int. Cl.$^5$ .............................................. B62M 27/02
[52] U.S. Cl. .................................... 180/193; 180/190; 180/9.56; 305/16; 305/24
[58] Field of Search ............... 180/193, 190, 9.56, 180/9.5; 305/16, 24, 17, 29, 31

[56] References Cited

U.S. PATENT DOCUMENTS

| | | | |
|---|---|---|---|
| 3,727,709 | 4/1973 | Newman | 180/193 |
| 3,879,092 | 4/1975 | Rose | 180/193 |
| 3,933,213 | 1/1976 | Trowbridge | 305/24 |
| 3,945,663 | 3/1976 | Duckett | 280/124 F |
| 3,966,181 | 6/1976 | Lessard | 267/58 |
| 4,057,916 | 11/1977 | Rosemer | 180/190 |
| 4,131,266 | 12/1978 | Carter | 267/34 |
| 4,226,408 | 10/1980 | Tomita et al. | 267/64 |
| 4,311,302 | 1/1982 | Heyer et al. | 267/64.23 |
| 4,407,386 | 10/1983 | Yasui et al. | 305/24 |
| 4,411,342 | 10/1983 | Katsumori et al. | 188/315 |
| 4,442,926 | 4/1984 | Muto | 188/317 |
| 4,518,056 | 5/1985 | Kobayashi | 180/193 |
| 4,700,815 | 10/1987 | Persicke et al. | 188/286 |
| 4,987,965 | 1/1991 | Bourret | 180/193 |
| 5,265,692 | 11/1993 | Mallette | 180/193 |

*Primary Examiner*—Kenneth R. Rice
*Assistant Examiner*—Christopher P. Ellis
*Attorney, Agent, or Firm*—Reising, Ethington, Barnard, Perry & Milton

[57] ABSTRACT

A snowmobile construction comprising a body frame and having slide rails suspended from the body frame through a front and rear suspension arm, and an endless track which runs under tension upon a drive and a plurality of driven wheels rotatably borne on the slide rails. The rear suspension has front and rear suspension arms which connect the body frame and the slide rails in parallelogram linkage fashion. Compression coil springs and shock absorbers are operatively mounted between the slide rails and the front and rear suspension arms. An inclined slide block and slot coupling interconnects the rear suspension arm and each slide rail to automatically react both front and rear suspension arms upon initial encounter of the slide rails with a snow bump. This coupling also urges the chassis of the snowmobile into an upwardly pitched condition upon acceleration with the forward ends of the slide rails digging into the ground surface for enhanced traction.

15 Claims, 6 Drawing Sheets

PRIOR ART

Fig.1

PRIOR ART

LONG TRAVEL SUSPENSION FOR TRACKED VEHICLE

This application is a continuation-in-part of U.S. patent application Ser. No. 07/951,152 filed Sep. 25, 1992, now abandoned.

FIELD OF THE INVENTION

This invention relates to vehicle suspensions, and more particularly, to a new and improved suspension of an endless drive track of a snowmobile that provides improved vehicle control and comfort of humans using the vehicle over a wide range of terrain from smooth to rough holed and mounded areas of snow and ice and a wide range of speeds and when cornering.

BACKGROUND OF THE INVENTION

Prior art U.S. Pat. Nos. 4,518,056 and 3,966,188 whose detailed description and drawings are specifically incorporated by reference into this specification.

Tracked vehicles such as snowmobiles have rear suspension systems generally consisting of front and rear suspension arms pivotally mounted on a shaft rotatably connected to the frame of the snowmobile and a slide frame comprising a pair of laterally spaced slide rails or longitudinal skids interconnected transversely on opposite sides of the machine. The slide rails are in sliding contact with an endless belt which provides ice and snow surface contact and friction drive for the snowmobile. In many current arrangements, there are four suspension arms: a front pair of arms located on opposite sides of the snowmobile and pivotally connected to the forward end of the slide rails, and a separate rear pair of arms. Each pair is connected to the slide rails or to a bracket capable of pivoting movement. A shackle or sliding block mechanism interconnects the rear suspension arm and the slide rails to permit relative linear movement.

This configuration allows the front and rear suspension arms to operate independent of one another which is thought advantageous in the prior art because of favorable weight transfer characteristics which enhance traction. This independence, however, has been found to result in rough and unsteady rides for the rider, particularly when the rear suspension of the track encounters an elevated mound of ice or snow or the upward side of a depression. This detracts from the enjoyment and the utility of the vehicle since there are many areas which, when traversed, will unduly subject the rider(s) to severe jolts and stress.

The independence between the front and rear suspension arms adversely affects the snowmobile in several ways. First, track tension is not adequately maintained when there is extreme deflection of either one of the front or rear suspension arms. Particularly, when there is an excess of 7 inches of suspension arm travel measured vertically between the suspension arm connection to the chassis and the suspension arm connection to the slide rails.

Second, it requires the associated springs and shock absorbers to be sprung and dampened stiffly because each must individually support the high loads when impact occurs at either the front or rear extreme of the slide rails. That is, because each suspension arm acts independently, it must be engineered to withstand and control the full impact of the bump and weight of the snowmobile by itself. This results in a normal ride that is less comfortable due to stiffness.

Third, when the front suspension arm deflects as it contacts a bump, the independent rear suspension arm remains in its ride position or fully extended position. This results in an angle of incidence between the slide rails and the bump. Unless the impact is then large enough to compress the rear suspension arm spring and shock absorber assembly, thereby flattening the angle of incidence, the slide rails will act as a ramp forcing the rear of the snowmobile upward. That is, with the slide rails angled in an upward incline due to the independent deflection of the front suspension arm but not the rear suspension arm, the snowmobile will hop over the pump, imparting a secondary jolt which increases in intensity with the speed of the snowmobile.

Some prior art suspensions have been made to reduce the independent movement between the front and rear suspension arms in an attempt to diminish the adverse effects described above. However, such attempts have resulted in the creation of additional problems. One of these additional problems relates to traction of the snowmobile upon acceleration caused by the improper transfer of weight by the suspension assembly. When a snowmobile is rapidly accelerated, a drive sprocket driven by the engine creates an abrupt tension in the upper surface of the track. This tension reacts through the rear track support wheels resulting in a forwardly directed force to the slide rails. Therefore, upon rapid acceleration, the slide rails are urged forwardly.

SUMMARY OF THE INVENTION AND ADVANTAGES

The present invention comprises a suspension assembly for suspending an endless track beneath the chassis of a tracked vehicle, e.g., a snowmobile, and maintaining the track traction at a substantially uniform tension while the snowmobile accelerates and traverses bumpy terrain. The assembly comprises an elongated slide rail having an upwardly curved forward end and a rearward end. A front suspension arm has an upper end adapted for pivotal connection to the snowmobile chassis and a lower end pivotally connected to the slide rail adjacent its forward end. A rear suspension arm has an upper end adapted for pivotal connection to the snowmobile chassis and a lower end connected to the slide rail adjacent its rearward end. A biasing means urges the slide rail away from the upper ends of the front and rear suspension arms. The improvement of the invention comprises a weight transfer coupler means disposed between the lower end of the rear suspension arm and the slide rail for urging the rearward end of the slide rail in an elevated inclined condition relative to the forward end of the slide rail in response to forwardly acting forces imposed on the slide rail to transmit an increasing percentage of the snowmobile weight through the front suspension arm and the forward end of the slide rail during acceleration.

Good weight transfer is the result of torque applied to the track and then imparted to the slide rail through the front suspension arm. This allows the chassis to rotate around the front suspension arm during acceleration. The subject weight transfer coupler means is so effective that, upon initial acceleration, this rotation raises the front of the snowmobile often times lifting the skies slightly off of the ground. The result is a greatly increased amount of traction on the snowmobile as the weight force of the snowmobile and rider is concentrated over the very small surface area of track beneath the forward end of the slide rail. To accomplish this, the weight transferring coupler means elevates the rearward end of the slide rail during acceleration while simultaneously urging the forward end of the slide rail downwardly into contact with the ground support, thereby concentrating the weight force of the snowmobile and rider over a very small area of the track.

In addition, the unique geometric configuration of the subject suspension assembly provides an increased range of travel of the slide rail with an undue tilting of the slide rail when rough and bumpy surfaces are encountered. This is accomplished through a .coupling of the front and rear suspension arms to limit the amount of angular variations in the slide rail as it traverses uneven terrain. The limited angular movement of the slide rail allows the rear suspension to traverse snow bumps with little or no secondary impact to the rider(s). This limited angular movement of the slide rail also reduces the stretching and loosening of the track which is encountered in prior art designs whenever a track and slide rail assembly are displaced significantly. In other words, the suspension assembly of the subject invention maintains the track within an optimum tension range during all phases of operation to prevent derailment or breakage of the track.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
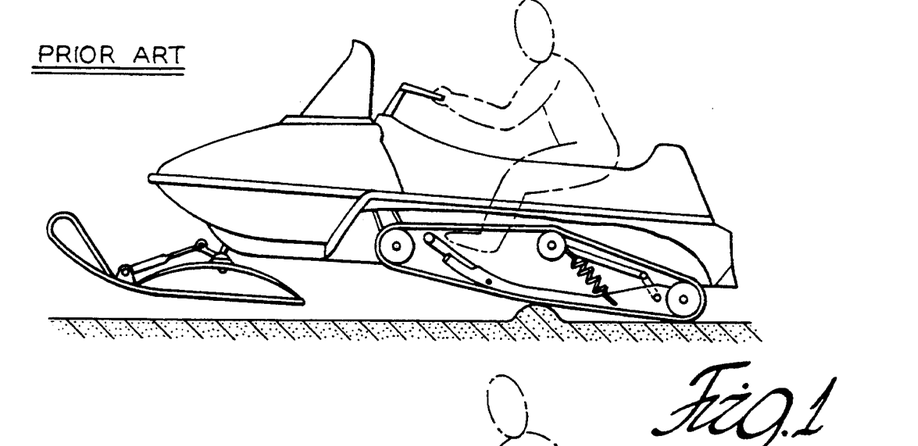
FIG. 1 is a side view of a snowmobile equipped with the prior art suspension assembly traversing a bump.
Figure 2:
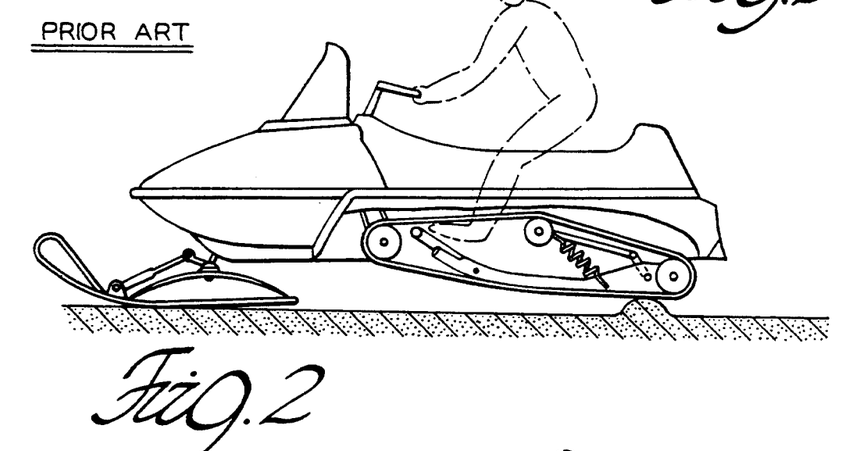
FIG. 2 is a view as in FIG. 1 showing the prior art suspension assembly clearing the bump.

FIGS. 1 and 2 illustrate a prior art snowmobile and suspension assembly wherein the front and rear suspension arms act independently of one another. As illustrated, when the front suspension arm contacts a bump, it raises while the rear suspension arm remains extended, thus creating an angle of incidence between the slide rails and the bump. The slide rails act as a ramp forcing the rear of the snowmobile chassis upward as the track climbs over the bump. This angled approach to the bump imparts a secondary jolt to the rider which increases in intensity with an increase in the speed at which the bump is approached. Additionally, this independence between the front and rear suspension arms causes uncontrollable slackening or tightening of the track, which ultimately results in track derailment or breakage.

Figure 3:
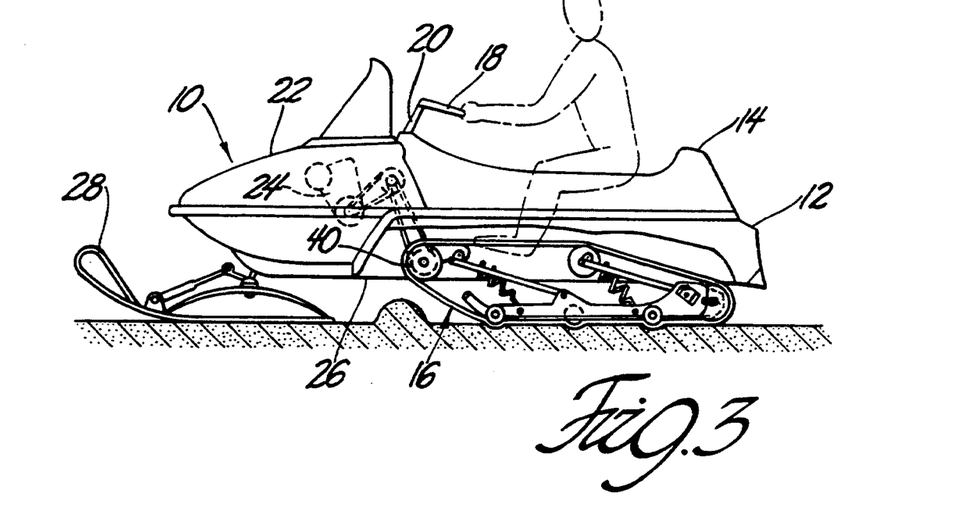
FIG. 3 is a side view of a snowmobile assembly equipped with a suspension assembly according to the subject invention.

Turning now in greater detail to FIG. 3, a snowmobile is generally shown at 10 having a body frame or chassis 12 that mounts a seat 14 on the upper side thereof. A suspension and endless track assembly is generally indicated at 16.

When seated on the snowmobile seat 14, a driver manually steers the vehicle 10 by a handlebar assembly 18 that is secured to a steering shaft 20 which extends through a compartment 22 for the internal combustion engine 24 and belly pan 26 into operable connection with a pair of steerable skis 28 through suitable steering linkage preferably arranged so that the inside cornering ski 28 turns at a greater angle than the outside ski 28 of the turn to provide comfortable steering. Also, a forward angling of the ski support legs causes the steering skis 28 to bank into turns for improved maneuverability and handling.

The belly pan 26 curves rearwardly to the forward end of the endless track assembly 16 of the vehicle 10. The full weight of the driver and a major percentage of the vehicle weight rides directly over the track assembly 16 for improved traction.

The track assembly 16 has a cushioning track suspension system which is of the slide rail type, as illustrated in FIGS. 4-8, which can be adjusted for weight distribution and ride. A pair of slide rails 30 mount track support wheels 32, 34, 36 which contact an inner surface of the track 38 so that the snowmobile 10 can traverse uneven surfaces of the snow and ice with a smoother ride and firmer control as compared to various alternative prior art systems.

The engine 24 has a drive chain or other system that transmits engine torque to a pair of main drive wheels or sprockets 40 which drivingly engage the inner drive surface of the track 38. Trailing rear track support wheels 42 are supported on the slide rails 30 by an axle shaft 44.

Figure 4:
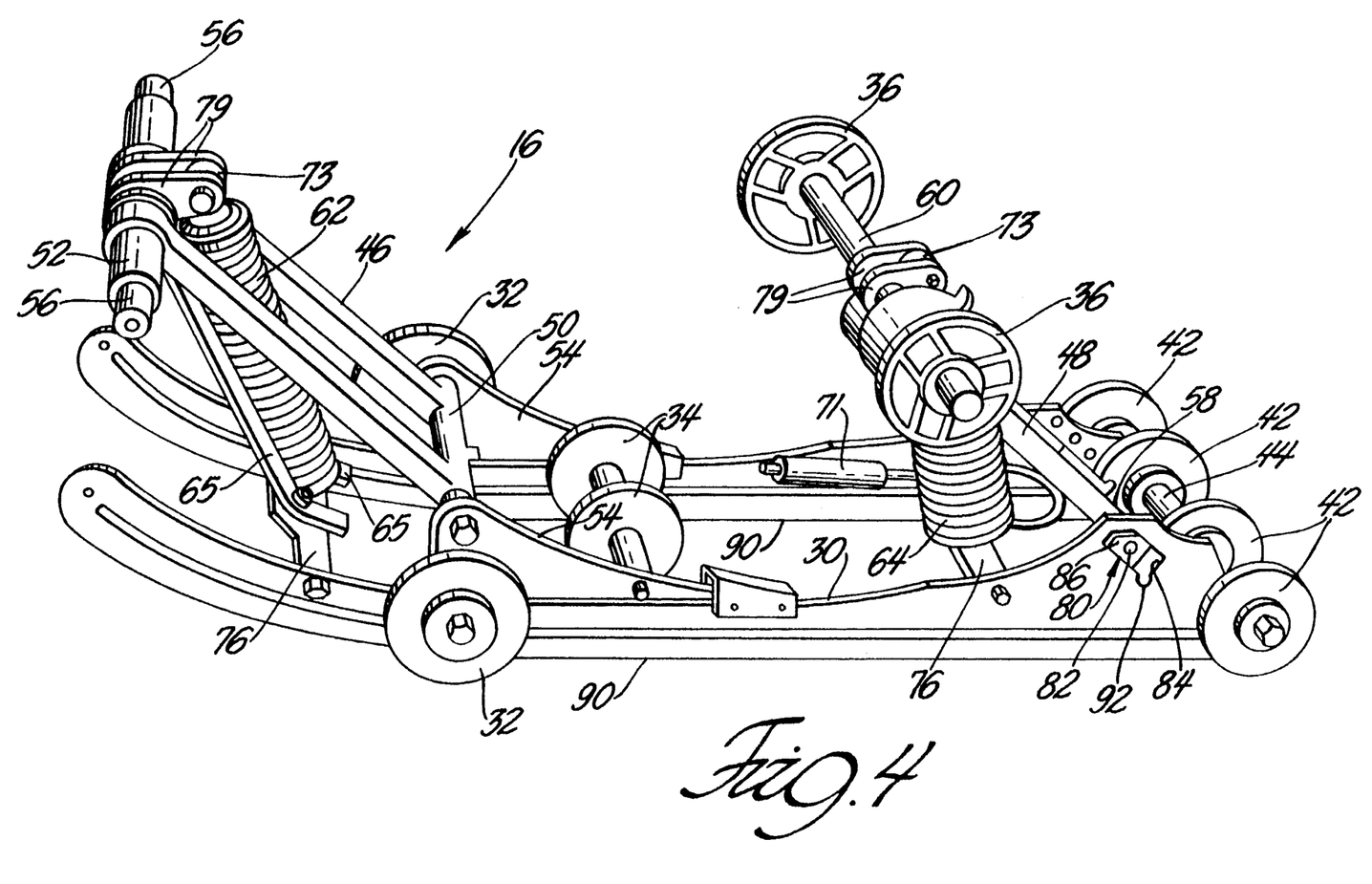
FIG. 4 is a perspective view of the suspension assembly of the subject invention.
Figure 9:
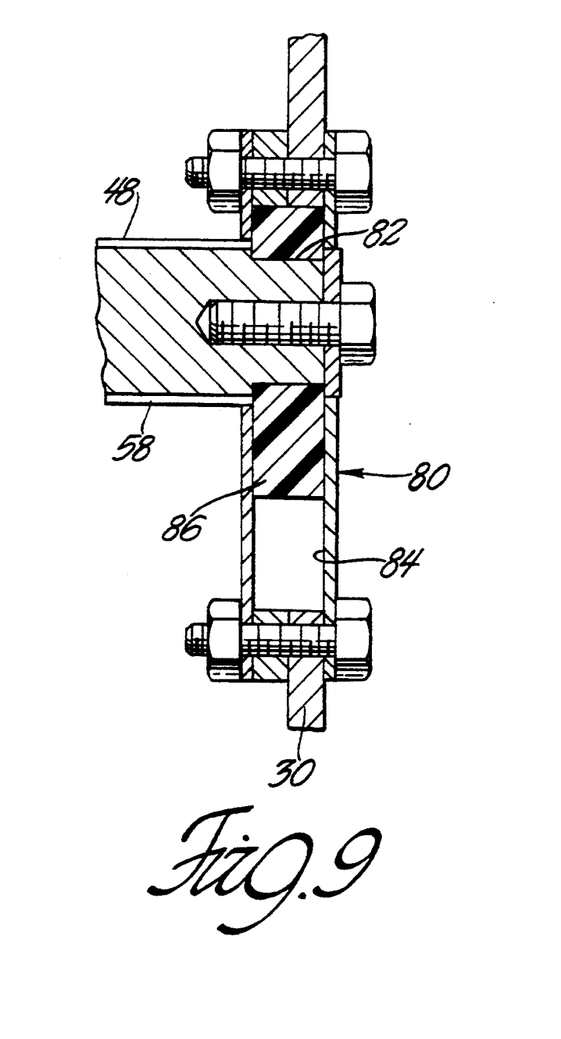
FIG. 9 is a cross-sectional view taken along lines 9—9 of FIG. 6.

Front and rear suspension arms 46 and 48, respectively, interconnect the slide rails 30 with the body frame 12. The front suspension arm 46 has a lower end pivoted at 50 to an ear 54 or other support structure extending upward from the respective slide rails 30. The upper end 52 of the front suspension arm 46 is pivotally supported by the upper pivot 56 connected to the chassis or frame 12. The rear suspension arm 48 is similar to the front suspension arm 46 in construction and length. The rear suspension arm 48 includes a lower end 58 and an upper pivoted end 60 connected to the snowmobile chassis 12, as shown in FIGS. 4 and 9.

A biasing means is provided for urging the slide rails 30 away from the upper ends 52, 60 of the front 46 and rear 48 suspension arms. The biasing means preferably includes helical compression springs 62, 64 however other spring forms such as torsion springs or composite leaf springs may also be used. An extension limiter, such as straps 65 shown in FIG. 4, may be used to prevent over extension of the slide rails 30 by the springs 62, 64.

A dampener means is provided for dampening the displacement and return rate of the biasing means. The dampener means includes front and rear suspension struts 66, 68, shown in FIGS. 4–8, each comprising a double acting hydraulic shock absorber with an outer support tube 70 pivotally connected at its lower end by a mounting member 75 to the slide rails 30 by a cross shaft 76. Alternatively, one or both of the shock absorbers 66, 68 may be of the gas-filled type. If of the gas-filled type, the rear shock absorber 68 may include a reservoir 71, as shown in FIG. 4.

The shock absorbers 66, 68 of the struts have a piston assembly 72 operatively mounted therein. Each piston assembly 72 has a piston rod 74 which has a mounting member 73 at their distal upper end that pivotally connects by the upper ends 52, 60 of the suspension arms 46, 48 to the body frame 12. Suspension springs 62, 64 seated on the lower shock absorber mounts 75 extend upward therefrom around the shock absorber piston rods 74 to an upper seat 78 within the mounting member 73 that is connected to a shock mount extension 79 from the upper ends 52, 60 of the suspension arms 46, 48. The upper end 60 of the rear suspension arm 48 is connected with the rear spring 64 suspension and shock absorber 68 unit. The springs 62, 64 provide spring suspension for the slide rails 30 as the shock absorbers 66, 68 reciprocate in their cylinder tubes 70 to hydraulically (or gas-hydraulically) check the action of the suspension springs 62, 64.

A weight transferring coupler means, generally indicated at 80 in FIGS. 4–9, is disposed between the lower end 58 of the rear suspension arm 48 and each of the slide rails 30 for urging the rearward end of the slide rails 30 in an elevated inclined condition relative to the forward end of the slide rails 30 in response to forwardly acting forces imposed on the slide rails 30 to transmit an increasing percentage of the snowmobile 10 weight through the front suspension arm 46 and the forward end of the slide rails 30 during acceleration. Thus, the weight transferring coupler means 80 results in good weight transfer when accelerating torque is applied to the track 38 through the slide rails 30. This allows the snowmobile chassis 12 to rotate around the front suspension arm 46, initially raising the front of the snowmobile 10 and often times lifting the skis 28 off the ground.

It is well known that the friction associated with traction is dependent upon the contact pressure, i.e., the weight forces distributed over the contacting surface area. Thus, the weight transferring coupler means 80 greatly increases the amount of traction of the snowmobile 10 by lifting the rearward end of the slide rails 30 up, away from the ground, and forcing the forward end of the slide rails 30 and track 38 forwardly and downwardly into biting engagement with the ground, thereby concentrating the weight force of the snowmobile 10 and rider over a very small surface area.

Figure 10:
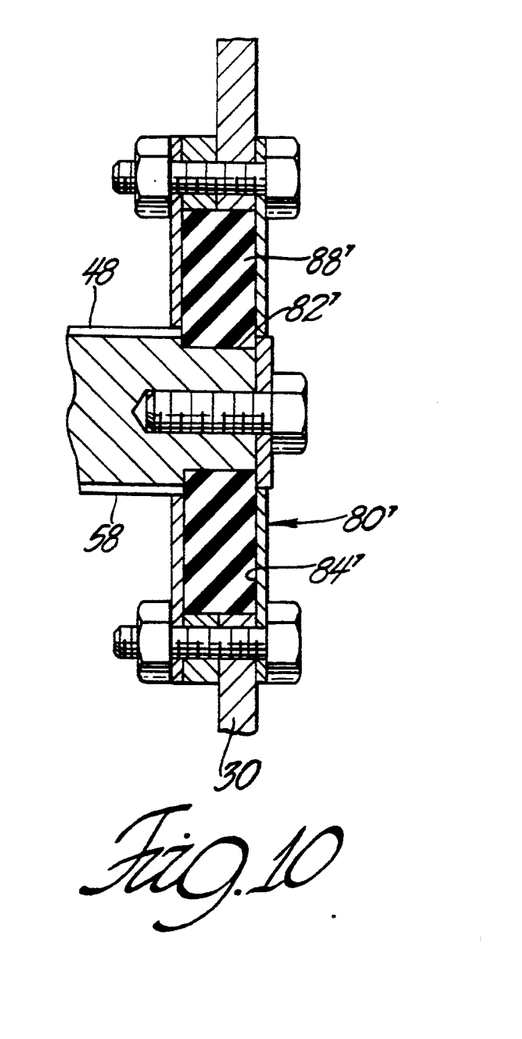
FIG. 10 is a view as in FIG. 9 showing an alternative embodiment of the weight transferring coupler means.

The weight transferring coupler means 80 includes a pintle 82 extending from each side of the lower end 58 of the rear suspension arm 48 such that one pintle 82 is provided for each of the slide rails 30. A slot 84 is formed in each of the slide rails 30 with the pintles 82 disposed in the slots 84. A slide block 86 pivotally surrounds each pintle 82 and is slideably disposed in each of the slots 84, as shown in FIGS. 5–9. Alternatively, as shown in FIG. 10, instead of the slide block 86' the pintles 82' may be held in the slots 84' with an elastomer 88' which allows resilient pintle 82' displacement only in the direction of the slot 84'.

As well known in the art, the slide rails 30 have a generally linear bottom track engaging portion 90 which extends rearwardly from their upwardly curved forward ends. The slots 84 formed in the slide rails 30 preferably extend at an acute angle relative to the linear bottom track engaging portion 90 of the slide rails 30. In practice, angles of 45° have been found to provide satisfactory results, however it will be readily appreciated by those skilled in the art that other acute angles or curvilinear configurations are also possible.

The angle of the slot 84 provides two important functions. First, the angle of the slot 84 is generally aligned with the angle of the rear suspension arm 48 when a driver is mounted on the snowmobile 10. Thus, because the slot 84 is generally aligned with the angle of the rear suspension arm 48, any forces transmitted along the rear suspension arm 48 are eliminated. This is because, due to the rear suspension arm 48 pivotable upper connection 60 the rear suspension arm 48 is not capable of transmitting a moment, or torque, thus allowing only linear force transmission only along its length. Said another way, the shock absorber 68 and spring 64 combination adjacent the rear suspension arm 48 necessarily transmits all weight force at that rearward end of the slide rails 30 because the rear suspension arm 48 is generally aligned with the angle of slot which provides no back-up, or restraint, to the forces otherwise transferred down the length of the rear suspension arm 48 because the slide block 86 will not bottom in the slot 86 simply under the static weight of a rider. Therefore, very little friction (i.e., only that friction caused by the vector component of the weight force resulting from any misalignment between the angle of the slot 84 and the rear suspension arm 48) is imparted between the slide block 86 and the side walls of the slot 84. The reduction in friction allows the couple mechanism 80 to operate with very little resistance.

Secondly, the angled orientation of the slot 84 provides a ramping effect, or camming effect, urging the rearward end of the slide rails 30 upwardly upon application of a forwardly directed force to the slide rails 30 during acceleration. Or, thought of in the reverse relative sense, the camming action forces the snowmobile chassis 12 to rotate in nose-up condition thus shifting weight from the front skies 28 to the rear suspension assembly 16. This, coupled with the fact that very little friction is generated by way of the generally aligned angle of the rear suspension arm 48 and the slots 84 means that during acceleration of the snowmobile 10 there is very little resistance to this transfer of weight which results in an increase belt 38 traction. Said another way, the angled slots 84 allow the front of the chassis 12 to rotate upwardly, i.e., clockwise as viewed from FIGS. 5–8, about the front suspension arm 46 upon acceleration thus concentrating the weight forces upon the forward ends of the slide rails 30.

A small debris escape port 92 is formed in the lowermost corner of each slot 84 for expelling snow, dirt and other debris which may locate in the slot 84 during operation. Also, preferably, the slide blocks 86 are fabricated from a synthetic material, such as nylon or other high density, high lubricity polymer.

Figure 5:
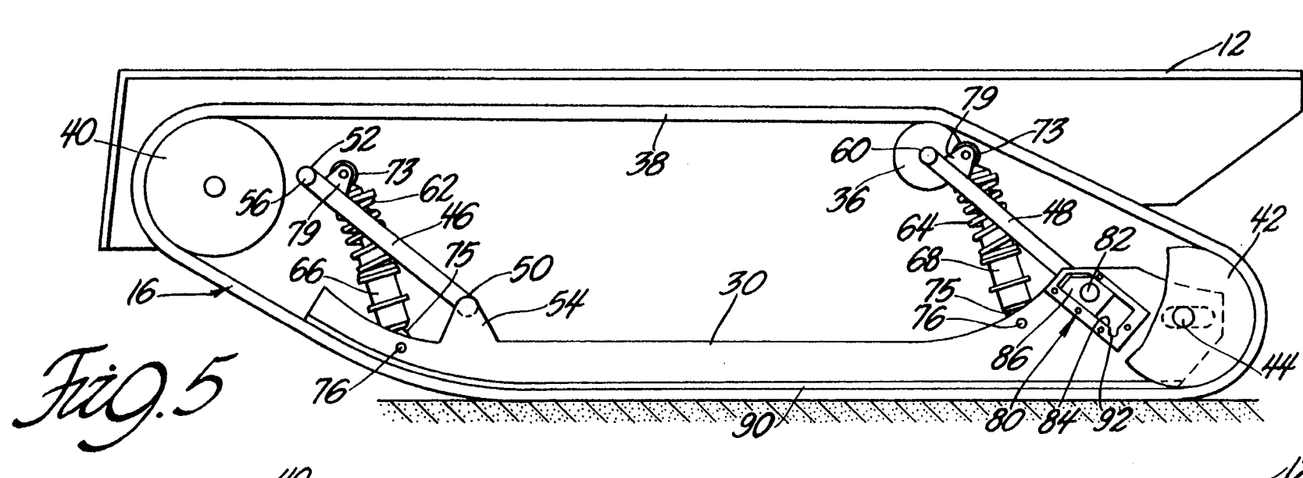
FIG. 5 is a side view of the suspension assembly during normal operation.
Figure 6:
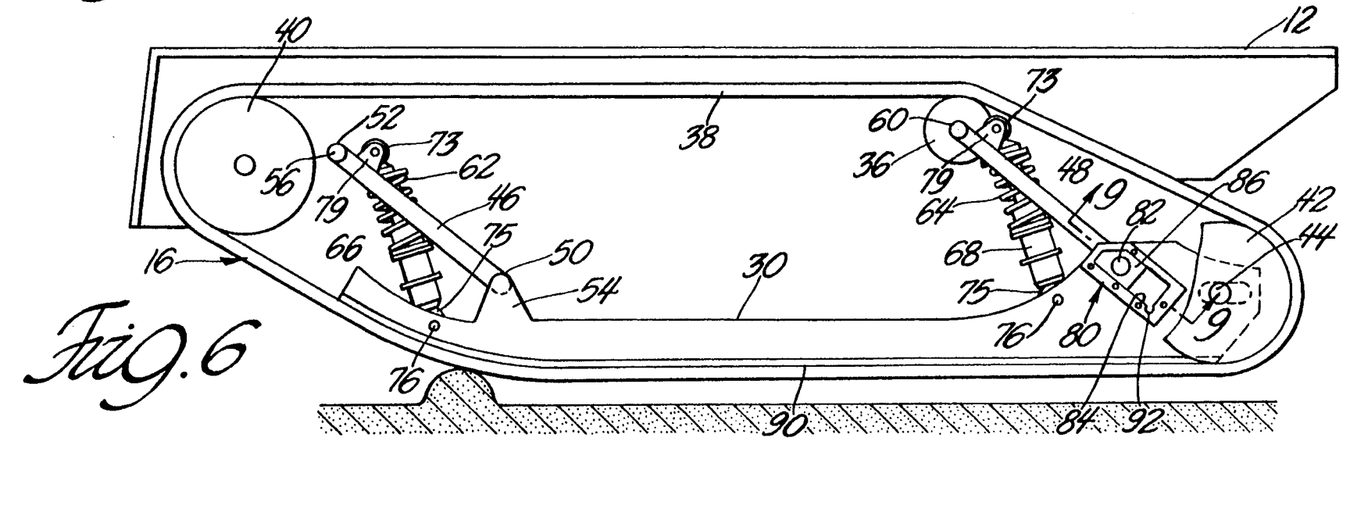
FIG. 6 is a view as in FIG. 5 showing the suspension assembly traversing a bump.

There is normally a slight clearance (e.g., 0.25 inch) between the upper contact face of the slide block 86 and the upper end of the slot 84, as shown in FIG. 5. When the forward end of the slide rails 30 first encounter a mound of snow or other bump, the slide rails 30 will move rearwardly and the front suspension arm 46 will begin to turn at its upper end pivot 52. When this occurs, as shown in FIG. 6, the inclined walls of the slide block 86 and the slot 84 will take up the clearance (e.g., 0.25 inch) so that the rear suspension arm 48 then automatically couples with the front suspension arm 46 so that they move in concert. On this automatic coupling, a parallelogram linkage is established so that as the slide rails 30 move, their linear bottom track engaging portions 90 remain substantially parallel to the ground.

Figure 7:
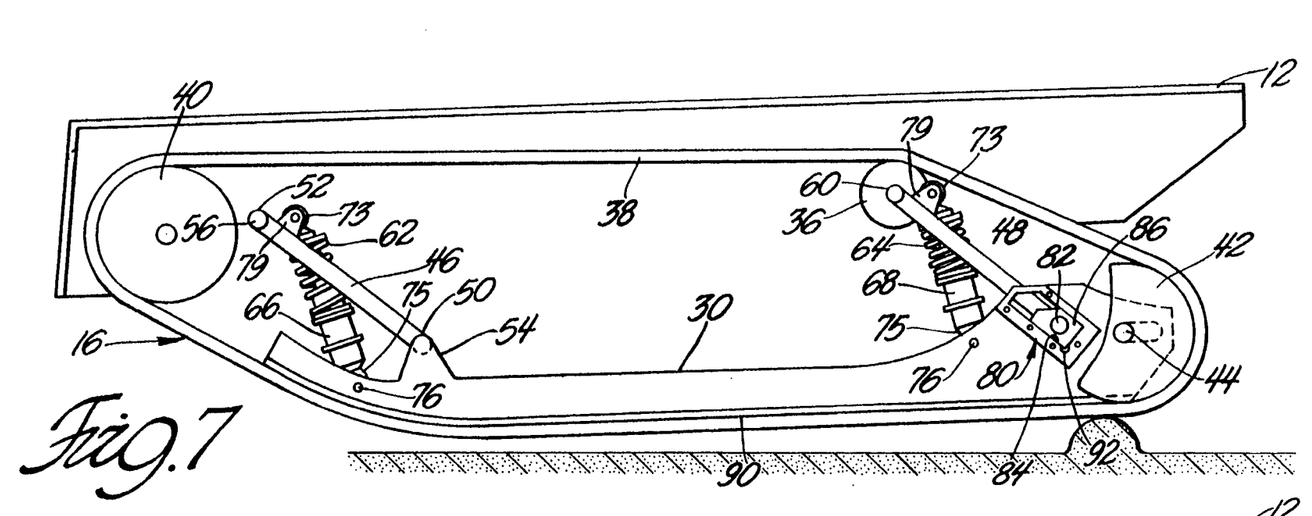
FIG. 7 is a view as in FIG. 6 showing the suspension assembly clearing the bump.

Then, as shown in FIG. 7, as the slide rails 30 begin to clear the mound of snow, the biasing action of the front spring 62 suspension and shock absorber 66 unit and its extended lever arm position force the forward end of the slide rails 30 downwardly to meet the ground, thereby resulting in the slide blocks 86 being displaced to the bottom lower ends of the slots 84. Once the slide blocks 86 bottom in their slots 84, the front and rear suspension arms 46, 48 are once again coupled. This results in a smooth transition over the bump back to flat ground. Once on flat ground again, the suspension 16 returns to the normal ride position of FIG. 5 with the slide blocks 86 located adjacent the upper end of the respective slots 84, with only a slight clearance, e.g., in the order of 0.25 inch, between the two members.

Accordingly, when the slide rails 30 encounter a bump, a signal is sent through the sliding coupling 80 to actively connect the front 46 and rear 48 suspension arms so that both arms swing together for maintaining slide rail 30 orientation throughout the bump. This, among other advantages, reduces or eliminates the secondary kick normally experienced when bumps are encountered.

Figure 8:
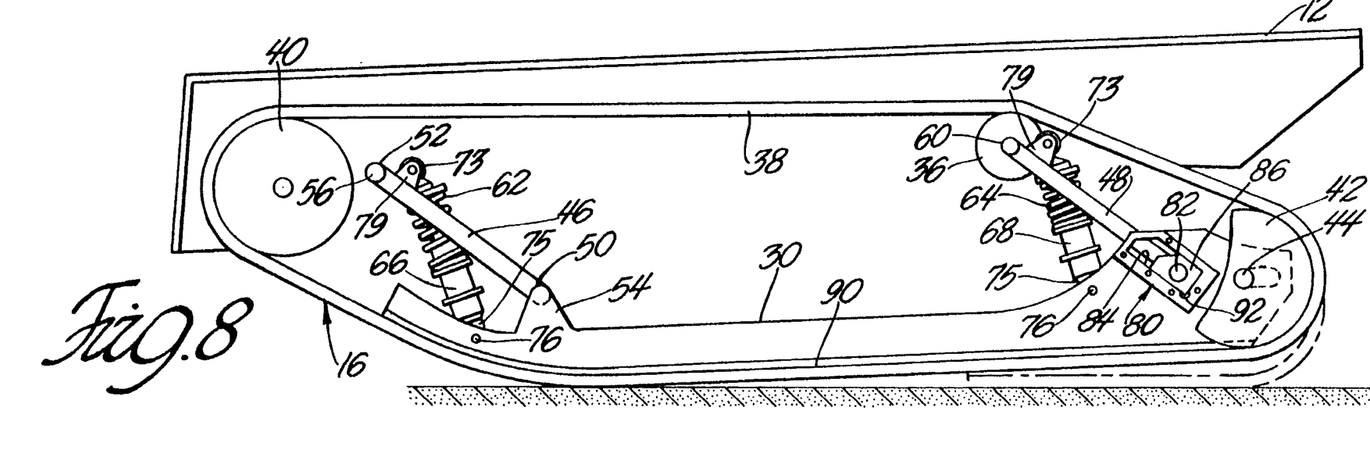
FIG. 8 is a side view of the suspension assembly during acceleration, and with the suspension assembly shown in the normal travel (zero acceleration) position in phantom.

The improved weight transfer phenomena accomplished by the subject suspension 16 is illustrated in FIG. 8. In FIG. 8, the suspension assembly 16 is illustrated in phantom in the normal travel position, similar to that shown in FIG. 5. However, upon application of a torque to the drive sprocket 40, a forwardly acting force is imparted to the slide rails 30 via increased track tension pulling against the rear track support wheels 42. This creates a camming effect with the slot 84 of the Weight transferring coupler means 80 riding up (in a relative sense) the slide block 86 to upwardly displace the rearward ends of the slide rails 30 and, at the same time, forwardly and downwardly displace the forward end of the slide rails 30 about the arc of the front suspension arm 46. This action causes an increasing percentage of the snowmobile 10 weight and rider weight to be transferred substantially through the front suspension arm 46 and forward ends of the slide rails 30. This, in turn, concentrates this weight force over a very small surface area of the track 38 to increase traction.

The use of coupling between the front 46 and rear 48 suspension arms also allows for softer spring 62, 64 rates and shock absorber 66, 68 calibrations. This configuration thus permits use of a less expensive suspension system that would normally be used to isolate the rider from severe bottoming. The weight transferring coupler means 80 of the subject invention allows a controlled amount of independence between the front 46 and rear 48 arms, i.e., when accelerating and clearing bumps, but stops the at front 46 and rear 48 suspension arms from acting totally independent of one another.

When an impact occurs at either end of the slide rails 30, either at their forward or rearward ends, the weight transferring couple mechanism 80 forces the other non-impacted suspension arm to engage at a predetermined displacement when the slide block 86 bottoms or tops out against the slot 84 forming a parallelogram (four-bar linkage) lending spring and dampening force to the other impacted suspension arm. This lending of spring and dampening force between the two suspension arms 46, 48 ultimately requires less work from the individual components. In other words, there is a sharing of work between the spring 62, 64 and shock absorber 66, 68 combinations at the front 46 and rear 48 suspension arms. This makes is possible to use softer shock and spring calibrations than normal thus permitting use of less expensive shock and spring assemblies and also eliminates the sophisticated linkages normally used on performance snowmobiles thus further reducing cost as well as weight. Such prior art linkages used to manipulate the shock absorber travel into progressively faster shock speed during suspension travel is known as "rising rate" in the industry.

In the present invention, the shock absorbers 66, 68 are attached in simple fashion without extra linkages, as was common practice in the prior art. This geometry, as illustrated in FIGS. 4–8, is known in the industry as "falling rate", referring to the fact that the speed of the shock absorbers 66, 68 decreases, i.e., decelerates, during compression travel. With this decrease in speed comes an increase in rider comfort, resulting from reducing resistance as the suspension 16 travels. Falling rate geometry has been looked upon somewhat disfavorably in the prior art because, in a typical prior art suspension having a maximum of 7 inches of travel or less (between the suspension arms and the slide rails) there is a tendency for the suspension to bottom more easily. Even though the bottoming problem is largely avoided with this invention because of the increased travel (in excess of 7 inches), an improved dampening means is employed to provide progressively increased spring dampening as the suspension 16 approaches its maximum travel limits. Thus, the extra travel of this invention's suspension assembly 16 is further enhanced by the prevention of bottoming in a manner comfortable to the rider, whereby a progressive dampener 66, 68 of a unique design is employed.

Figure 11:
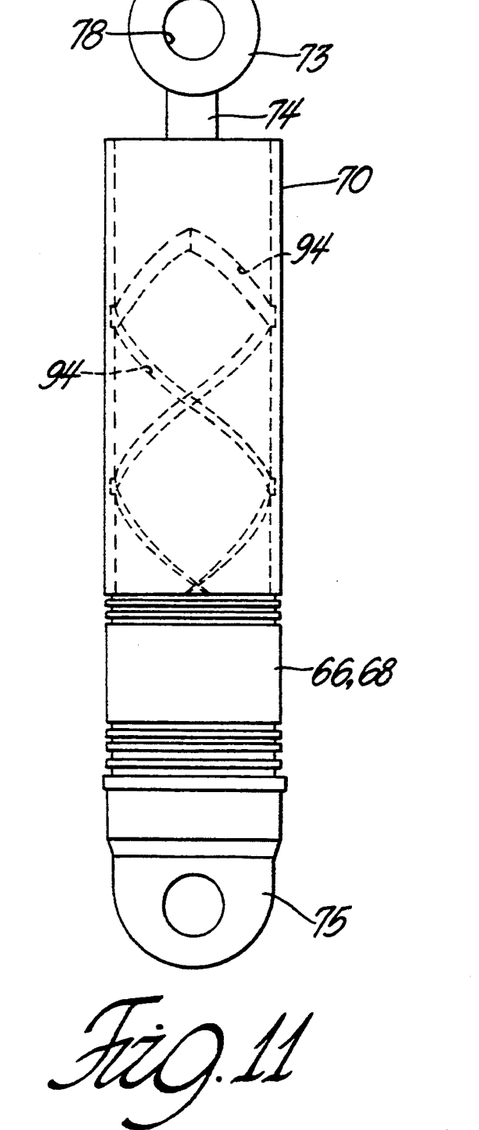
FIG. 11 is a simplified side view of the improved shock absorber assembly of the subject invention.
Figure 12:
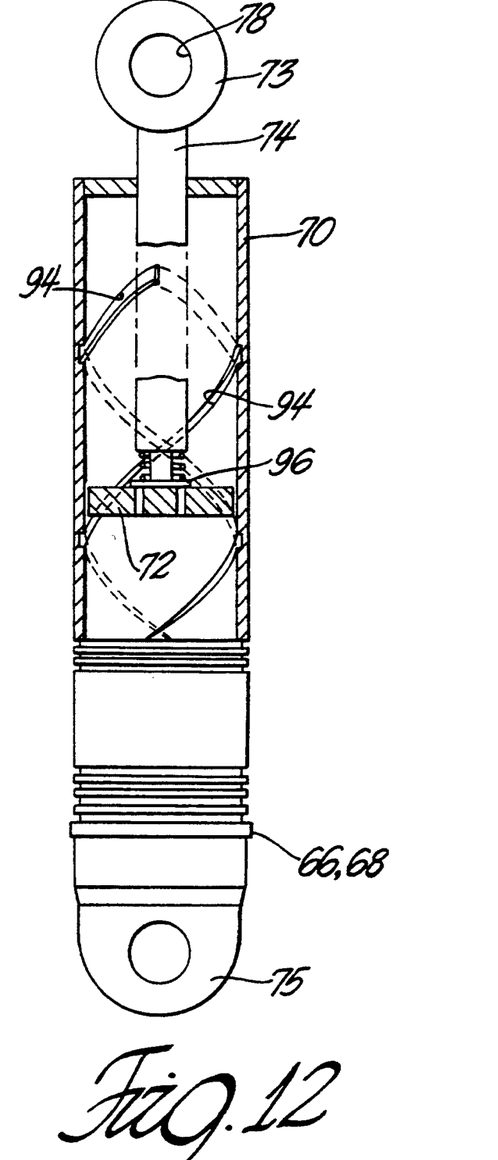
FIG. 12 is a simplified partial cross-sectional view of the shock absorber assembly of FIG. 11.

Turning to FIGS. 11 and 12, a shock absorber assembly having a progressive dampening effect is achieved by progressively decreasing the flow area through which the by-pass fluid may route during the stroke of the piston 72. To this end, a helical, tapered passage 94 is formed in the interior wall of the cylinder 70. This passage 94 runs along the side of the interior wall so that when the shock absorber 66, 68 is compressed or extended, the area of the passage 94 decreases, resulting in increased by-pass flow restriction therethrough. This, in turn, forces an increase of fluid to travel through the normal valving mechanism 96, thus providing a progressive dampening effect. Varying shock speeds may determine the amount of fluid to travel through the valving 96 and passage 94. The passage 94 area will decrease to zero at a predetermined ending position. This will force fluids to travel exclusively through the valving control mechanism 96. Alternatively, the passage 94 may run the entire useable length of the cylinder body 70. Also alternatively, as shown in FIGS. 11 and 12, there may be a pair of helical passages 94 arranged 180° out of phrase. Of course, more than two such passages 94 are possible, in which case it is preferable to locate the passages 94 in equally spaced circumferential increments, i.e., out of phase with each other, about the inner wall of the cylinder body 70.

The tapered passage 94 may vary in both cross-sectional area and axial position, depending on the suspension design and requirements. The helical design allows for consistent flow of fluid within the shock absorber 66, 68 and results in increased piston 72 and piston ring (not shown) life.

A suspension of falling rate design, i.e., as suspension movement increases the dampener movement decreases in its relative movement to the suspension in jounce, will benefit due to progressive flow restriction created by the helical tapered area passage 94. This allows for increased jounce dampening control of the suspension system. Alternatively, a suspension of rising design, i.e., as the suspension movement increases the dampener increases in its relative movement to the suspension in jounce, will see loss of dampening control in rebound. In this instance, an inverted helical tapered passage 94, i.e., one that enlarges with continued axial displacement, will allow for progressive and increased flow and dampening control in rebound. Alternatively, the helical passage 94 may have a constant cross-sectional area over a given axial length and then begin to restrict (or liberalize) flow by decreasing (or increasing) the cross sectional area of that passage 94 at different axial positions. This can be achieved by tapering the passage 94 or by varying the multiple passage 94 ending positions.

The helical nature of the passage 94 provides several advantages. For example, the helical shape is easily formed using a lathe technique, whereas prior art passages which are straight axial require a complicated broaching or forming technique. Also, the helical passage 94 promotes extended piston and piston ring life because the position at which the passage 94 and axially reciprocating piston assembly 72 meet is constantly varying. Also, as compared to prior art straight axial passages, the subject helical passage 94 allows the cylinder 70 to be manufactured from thinner gauge tubing because there is less chance of the cylinder 70 splitting along the passage from high internal pressures.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

What is claimed is:

1. A suspension assembly for suspending an endless track beneath a tracked vehicle chassis and maintaining the track at a substantially uniform tension while the vehicle accelerates and traverses bumpy terrain, said assembly comprising: an elongated slide rail having an upwardly curved forward end and a rearward end, and a generally linear bottom track engaging portion extending rearwardly from said upwardly curved forward end; a front suspension arm having an upper end adapted for pivotal connection to the vehicle chassis and a lower end pivotally connected to said slide rail adjacent said forward end; a rear suspension arm having an upper end for pivotal connection to the vehicle chassis and a lower end connected to said slide rail adjacent said rearward end; biasing means for urging said slide rail away from said upper ends of said front and rear suspension arms; and characterized by weight transferring coupler means disposed between said rear suspension arm and said slide rail for urging said rearward end of said slide rail in an elevated inclined condition relative to said forward end of said slide rail in response to forwardly acting forces imposed on said slide rail to transmit an increasing percentage of the vehicle weight through said front suspension arm and said forward end of said slide rail during acceleration, said weight transferring coupler means including a slot formed in said slide rail extending forwardly at an acute angle relative to said linear bottom track engaging portion wherein said slot receives said lower end of said rear suspension arm.

2. An assembly as set forth in claim 1 wherein said weight transferring coupler means includes a pintle extending from said lower end of said rear suspension arm and movably disposed in said slot.

3. An assembly as set forth in claim 2 wherein said weight transferring coupler means includes a slide block surrounding said pintle and slideably disposed in said slot.

4. An assembly as set forth in claim 2 wherein said weight transferring coupler means includes an elastomer surrounding said pintle and disposed in said slot.

5. An assembly as set forth in claim 1 wherein said slot has a debris escape port.

6. An assembly as set forth in claim 5 wherein said slide block is fabricated from a synthetic material.

7. An assembly as set forth in claim 1 wherein said front suspension arm has a length generally equal to said rear suspension arm.

8. An assembly as set forth in claim 1 further including dampener means for dampening said biasing means.

9. An assembly as set forth in claim 8 wherein said dampener means includes a rear piston and cylinder assembly extending between said rear suspension arm and said slide rail.

10. An assembly as set forth in claim 9 wherein said dampener means includes a front piston and cylinder assembly extending between said front suspension arm and said slide rail.

11. An assembly as set forth in claim 10 wherein said biasing means includes a front coil spring concentrically disposed about said front piston and cylinder assembly and a rear coil spring concentrically disposed about said rear piston and cylinder assembly.

12. An assembly as set forth in claim 11 wherein at least one of said forward and rearward piston and cylinder assemblies includes a helical groove formed in said cylinder.

13. An assembly as set forth in claim 12 wherein said helical groove has a tapering cross-sectional area.

14. An assembly as set forth in claim 1 further including a rear track support wheel rotatably disposed on said slide rail adjacent said rearward end.

15. An assembly as set forth in claim 1 further including a flexible endless track disposed in sliding engagement with said slide rail.

* * * * *